United States Patent
Nakazawa et al.

(10) Patent No.: US 7,425,588 B2
(45) Date of Patent: Sep. 16, 2008

(54) POLYMER COMPOSITION INCLUDING FUNCTIONAL MATERIAL, METHOD FOR PRODUCTION OF THE SAME, INKJET INK, AND IMAGE FORMATION METHOD AND IMAGE FORMATION APPARATUS USING THE SAME

(75) Inventors: Ikuo Nakazawa, Zama (JP); Koichi Sato, Atsugi (JP); Sakae Suda, Atsugi (JP); Masayuki Ikegami, Atsugi (JP); Keiichiro Tsubaki, Atsugi (JP)

(73) Assignee: Canon Kabushiki Kaisha, Tokyo (JP)

( * ) Notice: Subject to any disclaimer, the term of this patent is extended or adjusted under 35 U.S.C. 154(b) by 704 days.

(21) Appl. No.: 10/517,865

(22) PCT Filed: Mar. 5, 2003

(86) PCT No.: PCT/JP03/02539

§ 371 (c)(1),
(2), (4) Date: Dec. 10, 2004

(87) PCT Pub. No.: WO03/104324

PCT Pub. Date: Dec. 18, 2003

(65) Prior Publication Data

US 2005/0222296 A1 Oct. 6, 2005

(30) Foreign Application Priority Data

Jun. 11, 2002 (JP) ............................. 2002-169822

(51) Int. Cl.
C08K 9/00 (2006.01)
(52) U.S. Cl. ........................ 523/200; 523/205; 523/210
(58) Field of Classification Search ................. 523/200, 523/205, 210
See application file for complete search history.

(56) References Cited

U.S. PATENT DOCUMENTS

| | | |
|---|---|---|
| 4,313,124 A | 1/1982 | Hara |
| 4,345,262 A | 8/1982 | Shirato et al. |
| 4,459,600 A | 7/1984 | Sato et al. |
| 4,463,359 A | 7/1984 | Ayata et al. |
| 4,558,333 A | 12/1985 | Sugitani et al. |
| 4,723,129 A | 2/1988 | Endo et al. |
| 4,740,796 A | 4/1988 | Endo et al. |
| 5,085,698 A | 2/1992 | Ma et al. |
| 7,064,151 B1 * | 6/2006 | Berge et al. ................. 521/142 |
| 2002/0032252 A1 | 3/2002 | Ishizuka |
| 2003/0225185 A1 * | 12/2003 | Akers et al. ................. 523/160 |

FOREIGN PATENT DOCUMENTS

| | | |
|---|---|---|
| JP | 59-123670 A | 7/1984 |
| JP | 59-138461 A | 8/1984 |
| JP | 61-7948 B2 | 3/1986 |
| JP | 64-63185 A | 3/1989 |
| JP | 3-237426 A | 10/1991 |
| JP | 4-227668 A | 8/1992 |
| JP | 7-138553 A | 5/1995 |
| JP | 8-82809 A | 3/1996 |
| JP | 8-216392 A | 8/1996 |
| JP | 8-511728 A | 12/1996 |
| JP | 11-80221 A | 3/1999 |
| JP | 11-236523 A | 8/1999 |
| JP | 11-322866 A | 11/1999 |
| JP | 11-322942 A | 11/1999 |
| JP | 2002-97395 A | 4/2002 |
| WO | 95/28213 | 10/1995 |

OTHER PUBLICATIONS

International Searching Authority; Japanese Patent Office; "PCT International Search Report"; corresponding to International Application No. PCT/JP03/02539; date of mailing Apr. 15, 2003; (2 pages).

* cited by examiner

*Primary Examiner*—Edward J Cain
(74) *Attorney, Agent, or Firm*—Morgan & Finnegan, LLP (57) ABSTRACT

A polymer composition including a functional material, the composition containing at least a block polymer encapsulating a material of a predetermined function and a solvent, wherein a property of the polymer in the composition is changed in response to a stimulus, whereby the block polymer encapsulating the material agglomerates together, or an ink composition usable as an inkjet ink containing at least a block polymer encapsulating a coloring material and a solvent, wherein a property of the polymer in the composition is changed in response to a stimulus, whereby the block polymer encapsulating the coloring material agglomerates together. The change of the property of the block polymer in response to a stimulus is a change from the lyophilic nature to the lyophobic nature, or the lyophilic nature to the lyophobic nature.

1 Claim, 1 Drawing Sheet

FIG.1

POLYMER COMPOSITION INCLUDING FUNCTIONAL MATERIAL, METHOD FOR PRODUCTION OF THE SAME, INKJET INK, AND IMAGE FORMATION METHOD AND IMAGE FORMATION APPARATUS USING THE SAME

TECHNICAL FIELD

The present invention relates to a composition containing a block polymer encapsulating a material of a predetermined function and a solvent, a method for production of the same, and an image formation method and an image formation apparatus using the composition.

BACKGROUND ART

Aqueous dispersions containing functional materials have been widely used for agricultural chemicals such as herbicides and insecticides and drugs such as anticancer drugs, antiallergic drugs and anti-inflammatory drugs as functional materials. Meanwhile, coloring materials such as ink and toner containing a colorant in a form of solid particles are well known. In recent years, digital printing technologies represented by electrophotography and inkjet printing have been making great progress, and the significance of these technologies as an image formation technology is recognized more and more in office and home.

Among them, the inkjet technology has remarkable features such as compactness and low power consumption as a direct recording method. In addition, image quality has been rapidly improved owing to refinement of nozzles and the like. One example of the inkjet technology is a method in which ink supplied from an ink tank is heated by a heater in a nozzle to form a bubble therein by boiling, and the ink is discharged from the nozzle to form an image on a recording medium. Another method is a method in which a piezo element is vibrated to discharge ink from a nozzle. Since an aqueous dye solution is usually used in ink used in these methods, bleeding may occur when colors are superimposed, and a phenomenon called feathering may occur along paper fibers at a recording location on the recording medium. For the purpose of alleviating these problems, use of pigment dispersion ink is proposed (U.S. Pat. No. 5,085,698). However, many improvements are still desired.

DISCLOSURE OF THE INVENTION

In view of the above situations, the present invention provides a composition characterized in that a block polymer encapsulating a functional material agglomerates together in response to a stimulus applied.

Particularly, the present invention provides a composition suitable for an inkjet ink that alleviates bleeding and feathering and is excellent in fixation.

The present invention provides an image formation method and an image formation apparatus using the composition described above.

The first aspect of the present invention relates to a composition comprising a block polymer encapsulating a functional material of a predetermined function and a solvent, wherein the property of the block polymer changes in response to the applied stimulus, whereby the block polymer encapsulating the functional material agglomerates together.

The second aspect of the present invention is a method for production of the composition that agglomerates together in response to a stimulus, the method comprises the steps of:

completely dissolving a block polymer in a solvent; and
encapsulating the functional material in the block polymer by a change in the solvent environment.

The third aspect of the present invention is an image formation method characterized in that an image is formed on the medium through a process that the composition is applied to a medium, and the property of the block polymer is changed in response to a received stimulus, whereby the block polymer encapsulating the functional material agglomerates together. The block polymer preferably forms micelles. Particularly, in a polymer-containing composition containing a material having a functional material included in an amphipathic block polymer having a hydrophobic segment and a nonionic hydrophilic segment and a solvent, it is preferable that the particle size of the material is increased by a change in pH for fixation on a recording medium.

The fourth aspect of the present invention is an image formation apparatus that comprises means for applying the composition to a medium, and is used for forming an image on the medium.

BEST MODE FOR CARRYING OUT THE INVENTION

The present invention will be described in detail below.

The inventors of the present invention studied the above-described situations and technical problems and completed the present invention.

The first aspect of the present invention is a composition comprising a block polymer encapsulating a functional material of a predetermined function and a solvent, characterized in that a property of the block polymer will change in response to a stimulus applied, whereby the block polymer encapsulating the functional material agglomerates together. Hereinafter such a composition is referred to as "the composition". Preferably, such a composition contains micelles of a block polymer encapsulating a functional material of a predetermined function and a solvent, characterized in that a property of the block polymer will change in response to a stimulus applied to cause aggregation of the block polymer micelles.

The "material being encapsulated in a block polymer" refers to such a state that a material is enclosed in the block polymer, e.g., a coloring material exists in hydrophobic core portions of the micelles of the block polymer in water.

The solvent (liquid medium) contained in the composition of the present invention is not specifically limited as long as it can dissolve, suspend or disperse the components of the composition. In the present invention, the solvent includes organic solvents such as various kinds of straight, branched or cyclic aliphatic hydrocarbons, aromatic hydrocarbons and heteroaromatic hydrocarbons, aqueous solvents and water. In order to accelerate drying on a recording medium such as paper, monohydric alcohols such as methanol, ethanol and isopropyl alcohol may be used.

The second aspect of the present invention is a method for production of the composition characterized in that the polymer is completely dissolved in a solvent, and then the solvent environment is changed to make the material included in the block polymer. More preferably, the change in solvent environment in the production method is at least one selected from change in temperature, irradiation with an electromagnetic wave, change in pH of the composition and change in the concentration of the composition. The range of temperature change preferably includes the phase transition temperature of the composition. Regarding the exposure to electromagnetic waves, the wavelength of the electromagnetic wave is preferably in the range of 100 to 800 nm. The range of pH change is preferably from pH 3 to pH 12. The range of the concentration change preferably covers a concentration at which the composition undergoes phase transition.

The third aspect of the present invention is an image formation method for forming an image by applying ink onto a recording medium, characterized in that a dispersion composition containing a block polymer encapsulating a coloring material is used as ink and a property of the polymer will change in response to a stimulus to cause agglomeration of the block polymer molecules. Preferably, the image formation method is characterized in that the dispersion composition contains a block polymer that forms micelles to encapsulate the coloring material and an image is formed through a process in which a property of the polymer changes in response to a stimulus applied to cause aggregation of the micelles of the polymer. More preferably, the stimulus applied in the image formation method is at least one selected from temperature change, irradiation of electromagnetic wave, pH change and change in concentration of the composition. The range of temperature change preferably includes the phase transition temperature of the composition. Regarding the exposure to electromagnetic waves, the wavelength of the electromagnetic wave is preferably in the range of 100 to 800 nm. The range of pH change is preferably from pH 3 to pH 12. The range of the concentration change preferably covers a concentration at which the composition undergoes phase transition.

The fourth aspect of the present invention is an image formation apparatus to be used for image formation using a dispersion composition that contains a block polymer encapsulating a pigment through a process in which a property of the polymer changes in response to a stimulus applied to cause agglomeration of the pigment-encapsulating block polymer. Preferably, it is an image formation apparatus to be used for image formation using a dispersion composition that contains block polymer micelles encapsulating a pigment through a process in which a property of the polymer changes in response to a stimulus applied to cause agglomeration of the micelles of the block polymer. More preferably, the stimulus applied in the image formation method is at least one selected from temperature change, irradiation of electromagnetic wave, pH change and change in concentration of the composition. The range of temperature change preferably includes the phase transition temperature of the composition. Regarding the exposure to electromagnetic waves, the wavelength of the electromagnetic wave is preferably in the range of 100 to 800 nm. The range of pH change is preferably from pH 3 to pH 12. The range of the concentration change preferably covers a concentration at which the composition undergoes phase transition.

The block polymer for use in the present invention is preferably an amphipathic block polymer. It is preferably an amphipathic block polymer having a hydrophobic segment and a nonionic hydrophilic segment, in other words, the block polymer contains at least one hydrophobic segment and at least one nonionic hydrophilic segment. Types of block structures include the followings. Representative ones are block polymers of AB type having different block segments, tri-block polymers of ABA having the same block segments at both ends, and tri-block polymers of ABC type having different block segments. There are also block polymers of ABCD type having different block segments, block polymers of ABCA type and block polymers having a larger number of block segments.

In the case of tri-block polymers of ABC type or block polymers having three or more block segments, at least one hydrophobic segment and at least one nonionic hydrophilic segment should be included in the block segments, and the other block segment may be a block segment having an ionic functional group.

The block polymers described above can be previously known block polymers such as acrylate or methacrylate block polymers, block polymers of polystyrene and other polymers of addition polymerization or condensation polymerization, and block polymers of polyoxyethylene and polyoxyalkylene.

More preferable one is a block polymer having a polyalkenyl ether structure as a repeating unit structure, and further more preferable one is a compound having a polyvinyl ether structure as a repeating unit structure.

Each block segment of the block polymer compound of the present invention may be composed of a single type of repeating units or may be composed of two or more types of repeating units. Examples of block segments composed of two or more types of repeating units include random copolymers and graduation copolymers having composition ratios gradually changed. The block polymer compound of the present invention may be a polymer where a block polymer of three or more block segments is bonded to another polymer by grafting.

The number average molecular weight (Mn) of the block polymer compound of the present invention is 200 to 10,000,000, preferably 1,000 to 1,000,000. If the number average molecular weight is greater than 10,000,000, entanglement within a polymer chain and between polymer chains may become so severe that the polymer is hard to be dispersed in a solvent. If the number average molecular weight is less than 200, the molecular weight is so small that a steric effect of the polymer may not be obtained. The polymerization degree of each block segment is preferably from 3 to 10,000. More preferable is from 5 to 5,000. Further more preferable is from 10 to 4,000.

For improvement of dispersion stability and improvement of inclusion properties (encapsulating properties), it is preferable that molecules of the block polymer are more flexible because the polymer can physically entangle with the surface of the functional material to increase affinity. As described in detail later, the flexibility is preferable in the point that a covering layer is easily formed on a recording medium. For this purpose, the glass transition temperature Tg of the main chain of the block polymer is preferably 20° C. or lower, more preferably 0° C. or lower, further more preferably −20° C. or lower. In this respect, a polymer having a polyvinyl ether structure is preferably used because the polymer generally has a low glass transition temperature and has flexible properties. Most of the example repeating unit structures described above have a glass transition temperature of about −20° C. or lower.

Polyvinyl ether that is characteristically used in the present invention is described. The features of the composition of the present invention, that is high dispersion stability, alleviation of bleeding and feathering and excellence in fixation, are mostly due to the polymer material having a polyvinyl ether structure used in the dispersion. As described above, stimulus responsivity in the present invention means that the shape or physical properties change drastically in response to environmental stimuli such as exposure to an electromagnetic wave, application of an electric field, temperature change, pH change, addition of a chemical material or concentration change of the composition. A polymer having a polyvinyl ether structure can provide stimulus responsibility to the composition. In such a composition, it is preferable the polymer also serves as a stabilizer of a pigment dispersion. Thus, polyvinyl ether preferably has both hydrophilic and hydrophobic portions, i.e. an amphipathic structure. Specifically, a polymer obtained by copolymerization of a hydrophilic monomer and a hydrophobic monomer can be a preferred example. Such a polymer having a polyvinyl ether structure has more preferable dispersion properties because the polyvinyl ether structure generally has a low transition temperature and flexibility, and its hydrophobic portion tends to physically entangle or has affinity with solid particles.

Various methods for synthesis of a polymer having a polyvinyl ether structure have been reported (for example, Japanese Patent Application Laid-Open No. H11-080221), among which a method by cationic living polymerization by Aoshima et al. (Japanese Patent Application Laid-Open Nos. H11-322942 and H11-322866) is representative. By synthesizing polymers by cationic living polymerization, various polymers such as homopolymers, copolymers of 2 or more monomers and block polymers, graft polymers and graduation polymers can be synthesized with the same length (molecular weight). Polyvinyl ether can have various functional groups on the side chain. Cationic polymerization can be carried out by the $HI/I_2$ system, $HCl/SnCl_4$ system or the like.

The first object of the addition of a polymer having a polyvinyl ether structure in the present invention is to provide stimulus responsivity, but other functions such as dispersion of solid particles (pigment etc.) may be also provided.

Typical stimuli and polymers of a polyvinyl structure responsive to the stimuli will be illustrated below.

Responses of the composition to changes in temperature include changes in solubility, thermal polymerization, changes in polarity, phase transition (sol-gel transition, liquid crystals) and the like. The range of the temperature change preferably covers the phase transition temperature of the composition, and more preferably covers a critical gel temperature. Polyvinyl ether structures responsive to a temperature stimulus are, for example, alkoxy vinyl ether derivatives such as poly(2-methoxyethyl vinyl ether) and poly(2-ethoxyethyl vinyl ether), and copolymers having these polymer compounds as the main components. Particularly, a block polymer of poly((2-methoxyethyl vinyl ether)-b-(2-ethoxyethyl vinyl ether)) causes a rapid change in viscosity at 20° C. Here b indicates being a block polymer.

Next stimulus responsivity is responsivity to exposure to an electromagnetic wave. The wavelength of the electromagnetic wave is more preferably in the range of 100 to 800 nm. Responses to a stimulus of exposure to an electromagnetic wave include, for example, solubility change, photo-polymerization, photochromism, photoisomerization, photodimerization, phase transition (sol-gel transition, liquid crystals). Polyvinyl ether structures responsive to the stimulus may include, for example, vinyl ether derivatives having functional groups for polymerization, such as poly(2-vinyloxyethyl methacrylate) and copolymers having such a polymer compound as the main component.

Regarding the response to a stimulus of pH change, it is preferable for the composition to respond to changes in the range of pH 3 to 12. Responses to a stimulus of pH change may include, for example, changes in solubility, hydrogen bonding and coordination bonding and polarity and phase transition (sol-gel transition, liquid crystals). Structures of the polymers having a polyvinyl ether structure, to be contained in a dispersion responsive to the stimuli, may include, for example, copolymers and polymer blends of alkoxy vinyl ether derivatives such as poly(2-methoxyethyl vinyl ether) and poly(2-ethoxyethyl vinyl ether) and polycarboxylic acid such as polymethacrylic acid.

Further stimulus examples may include concentration change in an aqueous ink. The stimulus is given by, for example, vaporization or absorption of water of the aqueous ink or a change in concentration of a polymer dissolved in the composition. For the stimulus, the concentration change preferably covers the phase transition concentration of the composition, and more preferably it covers a critical gel concentration. Response of the composition to the stimulus of concentration change includes, for example, hydrogen bonding, hydrophobic interaction and phase transition (sol-gel transition, liquid crystals). One example polymer is an alkoxy vinyl ether derivative such as poly(2-methoxyethyl vinyl ether) or poly(2-ethoxyethyl vinyl ether) or the like, aryl oxyvinyl ether derivative such as poly(2-phenoxyethyl vinyl ether) or copolymer having such a polymer as the main component.

Of these stimuli, two or more of types of stimuli can be combined. The function of stimulus response can be provided by a polymer having a polyvinyl ether structure. In the present invention, other polymers can be used to improve the function. For example, a polymer not having a polyvinyl ether structure can be used to provide stimulus responsivity, and a polymer having a polyvinyl ether structure is used to provide other functions (e.g. dispersion stability). Examples of other polymers having stimulus responsivity include those described below, but the present invention is not limited thereto. By adding into the composition a polymer other than a polymer having a polyvinyl ether structure (e.g. polymer having stimulus responsivity described above), stimulus responsivity can be added or improved.

A first example is such a polymer that causes phase transition when the composition is heated to cause change in the composition. Specific examples of such a polymer include poly(meta)acrylamide, poly N-alkyl substituted(meta)acrylamide such as poly-N-isopropyl(meta)acrylamide, poly N-vinylisobutylamide, poly(meta)acrylic acid or metal salts thereof, poly-2-hydroxyethyl(meta)acrylate, poly-N-(meta)acrylpiperidine, poly(2-ethyloxazolin), polyvinyl alcohol or partially saponified products thereof, polyethylene oxide, copolymers of polyethylene oxide and polypropylene oxide, poly(ethyleneglycolmonomethacrylate), poly(ethyleneglycolmonoacrylate), substituted cellulose derivatives such as methylcellulose, ethylcellulose, hydroxyethylcellulose and hydroxypropylcellulose and copolymers and polymer blends having these polymer compounds as the main components.

A second example is such a polymer that undergoes structure change by photoreaction to cause phase transition when the composition is exposed to the electromagnetic wave, to cause a change in the composition. Specific examples of the polymer include polymer compounds having groups such as photochromic groups. Specifically, they include various kinds of polymers, for instance, triphenylmethane derivatives that undergoes ion cleavage by light, poly(meta)acrylamides having a spiropyran derivative or spirooxazine derivative group, poly N-alkyl substituted (meta)acrylamides such as poly-N-isopropyl(meta)acrylamide and N-vinylisobutylamides.

A third example is such a polymer that causes phase transition when the composition of the composition is changed by a change in pH. Specific examples of such a polymer include poly(meta)acrylic acid or metal salts thereof, polyvinylsulfonic acid, polyvinylbenzenesulfonic acid, poly(meta)acrylamidealkylsulfonic acid, polymaleic acid or metal salts thereof, or copolymers based on monomer components constituting these polymer compounds, polyvinyl alcohol-polyacrylic acid composites or metal salts thereof, poly(ethyleneglycolmonomethacrylate), metal salts of carboxymethylcellulose, metal salts of carboxyethylcellulose, and copolymers and polymer blends having as main components these polymer compounds.

A fourth example is such a polymer that causes phase transition, when the concentration of the polymer dissolved in the composition is changed. Specific examples of such a polymer include polymer compounds having a lower critical solution temperature (LCST) such as poly(meta)acrylamide, poly N-alkyl-substituted(meta)acrylamide, polyvinyl methyl ether and polymethacrylic acid as aqueous solutions (Japanese Patent publication No. S61-7948, Japanese Patent Application Laid-Open No. H3-237426 and Japanese Patent Application Laid-Open No. H8-82809), polyvinyl alcohol, polyvinyl alcohol-polyacrylic acid complexes or metal salts thereof, poly(ethyleneglycol monomethacrylate), inorganic polymers such as alkoxy siloxane, and copolymers and polymer blends having as main components these polymer compounds.

The structure of the block polymer in the composition is not specifically limited but particularly, a polymer having a vinyl ether structure in at least one of the segments is more preferable.

Block polymer retains respective properties of the repeating monomer units of the blocks or units, and can exhibit these properties in a coexistent manner. These polymers can more effectively function than random polymers, since block or unit portions having stimulus responsivity can function effectively. Further, these polymers enable dispersion of solid particles an aqueous medium used to disperse the polymer. In this case, a part of the polymer should have an affinity for the aqueous solvent used. In the case of the polymer having a polyvinyl ether structure, various block forms such as AB, ABA and ABC are possible as described above, and the polymer preferably has two or more different types of hydrophilic blocks. The polymer can have ionic sites at its end.

The repeating unit structure of the polymer having the polyvinyl ether structure is not specifically limited, but preferable is expressed by the following General Formula (1):

General Formula (1)

wherein $R^1$ is selected from the group consisting of a straight, branched or cyclic alkyl group having 1 to 18 carbon atoms, phenyl(Ph), pyridyl(Pyr), Ph-Ph, Ph-Pyr, —(CH($R^2$))—CH($R^3$)—O)$_1$—$R^4$ and —(CH$_2$)$_m$—(O)$_n$—$R^4$, hydrogen on the aromatic ring may be replaced with a straight or branched alkyl group having 1 to 4 carbon atoms, and carbon in the aromatic ring may be replaced with nitrogen. l is selected from integers of 1 to 18, m is selected from integers of 1 to 36, and n is 0 or 1. $R^2$ and $R^3$ are independently H or CH$_3$. $R^4$ is H, a straight, branched or cyclic alkyl group having 1 to 18 carbon atoms, Ph, Pyr, Ph-Ph, Ph-Pyr, —CHO, —CH$_2$CHO, —CO—CH=CH$_2$, —CO—C(CH$_3$)=CH$_2$ or CH$_2$COOR$^5$, and if $R^4$ is not hydrogen, hydrogen on the carbon atom may be replaced with a straight or branched alkyl group having 1 to 4 carbon atoms or F, Cl or Br, and carbon in the aromatic ring may be replaced with nitrogen. $R^5$ is H or an alkyl group having 1 to 5 carbon atoms.

Preferably, $R^1$ is selected from the group consisting of a straight, branched or cyclic alkyl group having 1 to 18 carbon atoms, —(CH($R^2$)—CH($R^3$)—O)$_1$—$R^4$ and —(CH$_2$)$_m$—(O)$_n$—$R^4$. l and m are independently selected from integers of 1 to 12, and n is 0 or 1. $R^2$ and $R^3$ are independently H or CH$_3$. $R^4$ is H, a straight, branched or cyclic alkyl group having 1 to 6 carbon atoms, Ph, Pyr, Ph-Ph, Ph-Pyr, —CHO, —CH$_2$CHO, —CO—CH=CH$_2$, —CO—C(CH$_3$)=CH$_2$ or CH$_2$COOR$^5$, and if $R^4$ is not hydrogen, hydrogen on the carbon atom may be replaced with a straight or branched alkyl group having 1 to 4 carbon atoms. F, Cl or Br, and carbon in the aromatic ring may be replaced with nitrogen. $R^5$ is H or an alkyl group having 1 to 5 carbon atoms.

In the present invention, the straight or branched alkyl group is methyl, ethyl, n-propyl, i-propyl, n-butyl, sec-butyl, tert-butyl, pentyl, n-hexyl, heptyl, octyl, nonyl, decyl, undecyl, dodecyl, octadecyl or the like. The cyclic alkyl group is cyclopropyl, cyclobutyl, cyclopentyl, cyclohexyl, cyclooctyl or the like. Substitution of alkyl may be single or plural.

A preferable repeating unit structure of the polymer having a polyvinyl ether structure is expressed by the following general formula (2):

General Formula (2)

wherein $R^6$ is selected from the group consisting of a straight, branched or cyclic alkyl group, Ph, Pyr, Ph-Ph, Ph-Pyr, —(CH$_2$—CH$_2$—O)$_1$—$R^7$ and —(CH$_2$)$_m$—(O)$_n$—$R^7$, hydrogen on the aromatic ring may be replaced with a straight or branched alkyl group having carbon atoms 1 to 4, and carbon in the aromatic ring may be replaced with nitrogen. l is selected from integers of 1 to 18, m is selected from integers of 1 to 36, and n is 0 or 1. $R^7$ is comprised of H, a straight, branched or cyclic alkyl group having 1 to 18 carbon atoms, Ph, Pyr, Ph-Ph, Ph-Pyr, —CHO, —CH$_2$CHO, —CO—CH=CH$_2$, —CO—C(CH$_3$)=CH$_2$ or CH$_2$COOR$^8$, and if $R^7$ is not hydrogen, hydrogen on the carbon atom may be replaced with a straight or branched alkyl group having 1 to 4 carbon atoms or F, Cl or Br, and carbon in the aromatic ring may be replaced with nitrogen. $R^8$ is H or an alkyl group having 1 to 5 carbon atoms.

Preferably, $R^6$ is selected from the group consisting of a straight, branched or cyclic alkyl group having 1 to 18 carbon atoms, Ph, Pyr, Ph-Ph, Ph-Pyr, —(CH$_2$—CH$_2$—O)$_1$—$R^7$ and —(CH$_2$)$_m$—(O)$_n$—$R^7$, hydrogen on the aromatic ring may be replaced with a straight or branched alkyl group having carbon atoms 1 to 4, and carbon in the aromatic ring may be replaced with nitrogen. l is selected from integers of 1 to 18, m is selected from integers of 1 to 36, and n is 0 or 1. $R^7$ is comprised of H, a straight, branched or cyclic alkyl group having 1 to 18 carbon atoms, Ph, Pyr, Ph-Ph, Ph-Pyr, —CHO, —CO—CH=CH$_2$ or —CO—C(CH$_3$)=CH$_2$, and if $R^7$ is not hydrogen, hydrogen on the carbon atom may be replaced with a straight or branched alkyl group having 1 to 4 carbon atoms or F, Cl or Br, and carbon in the aromatic ring may be replaced with nitrogen.

More preferably, regarding the repeating unit molecular structure of the polymer that has the polyvinyl ether structure in the composition described above, the following vinyl ether monomers can be recited, but not limited thereto.

(I-a)

Block polymers having a polyvinyl ether structure made from these vinyl ether monomers can be suitably used in the present invention. The polymer that can be used in the present invention is not limited to stimulus-responsive polymers having a polyvinyl ether structure made from the vinyl ether monomers described above. Examples of these polymers are recited below, but not limited thereto.

Preferably, the numbers of repeating units of polyvinyl ether (x, y and z in (II-a) to (II-g) described above) are independently 1 to 10,000 and more preferably, the total of the numbers ((x+y+z) in (II-a) to (II-f) described above) is 10 to 40,000. If each segment in the block polymer having a polyvinyl ether structure is composed of two or more types of monomers, each segment may be a random polymer, gradient polymer or graft polymer.

Other components of the present invention will be described below.

The solvent in the composition of the present invention is preferably water or an aqueous solvent.

[Water]

Water contained in the composition of the present invention is preferably ion exchanged water free from metal ions and the like, pure water or ultrapure water.

[Aqueous Solvent]

For the aqueous solvent, polyhydric alcohols such as ethylene glycol, diethylene glycol, triethylene glycol, polyethylene glycol, propylene glycol, polypropylene glycol and glycerin, polyhydric alcohol ethers such as ethylene glycol monomethyl ether, ethylene glycol monoethyl ether, ethylene glycol monobutyl ether, diethylene glycol monoethyl ether and diethylene glycol monobutyl ether, nitrogen-containing solvents such as N-methyl-2-pyrolidone, substituted pyrolidone and triethanolamine, and the like may be used. For the purpose of accelerating drying on the recording medium, monohydric alcohol such as methanol, ethanol and isopropyl alcohol may be used.

In the present invention, the content of water and aqueous solvent described above is 20 to 95 wt % based on the total weight of the composition. It is more preferably 30 to 90 wt %.

[Coloring Material]

The coloring material useful in the present invention may be pigment or dye depending on applications of the composition of the present invention. The coloring material that is used in the composition of the present invention is preferably 0.1 to 50 wt % based on the weight of the composition.

Specific examples of the pigment and dye for use in the composition of the present invention will now be described. The pigment may be either an organic pigment or inorganic pigment and for the pigment that is used in ink, a black pigment and pigments of primary three colors, cyan, magenta and yellow, are preferably used. Pigments of other colors, colorless or light-colored pigments, metalescent pigments and the like may be also used. Pigments newly synthesized for the present invention may also be used.

Commercially available black, cyan, magenta and yellow pigments will be described with examples below.

Examples of black pigments include, but not limited to, Raven 1060, Raven 1080, Raven 1170, Raven 1200, Raven 1250, Raven 1255, Raven 1500, Raven 2000, Raven 3500, Raven 5250, Raven 5750, Raven 7000, Raven 5000 ULTRA II, Raven 1190 ULTRA II (all of the above, from Columbian Carbon Company), Black Pearls L, MOGUL-L, Regal 400R, Regal 660R, Regal 330R, Monarch 800, Monarch 880, Monarch 900, Monarch 1000, Monarch 1300, Monarch 1400 (all of the above, from Cabot Corporation), Color Black FW1, Color Black FW2, Color Black FW200, Color Black 18, Color Black S160, Color Black S170, Special Black 4, Special Black 4A, Special Black 6, Printex 35, Printex U, Printex 140U, Printex V, Printex 140V (all of the above, from Degussa AG), No. 25, No. 33, No. 40, No. 47, No. 52, No. 900, No. 2300, MCF-88, MA600, MA7, MA8, and MA100 (all of the above, from Mitsubishi Chemical Corporation).

Examples of cyan pigments include, but not limited to, C. I. Pigment Blue-1, C. I. Pigment Blue-2, C. I. Pigment Blue-3, C. I. Pigment Blue-15, C. I. Pigment Blue-15:2, C. I. Pigment Blue-15:3, C. I. Pigment Blue-15:4, C. I. Pigment Blue-16, C. I. Pigment Blue-22, and C. I. Pigment Blue-60.

Examples of magenta pigments include, but not limited to, C. I. Pigment Red-5, C. I. Pigment Red-7, C. I. Pigment Red-12, C. I. Pigment Red-48, C. I. Pigment Red-48:1, C. I. Pigment Red-57, C. I. Pigment Red-112, C. I. Pigment Red-122, C. I. Pigment Red-123, C. I. Pigment Red-146, C. I. Pigment Red-168, C. I. Pigment Red-184, C. I. Pigment Red-202, and C. I. Pigment Red-207.

Examples of yellow pigments include, but not limited to, C. I. Pigment Yellow-12, C. I. Pigment Yellow-13, C. I. Pigment Yellow-14, C. I. Pigment Yellow-16, C. I. Pigment Yellow-17, C. I. Pigment Yellow-74, C. I. Pigment Yellow-83, C. I. Pigment Yellow-93, C. I. Pigment Yellow-95, C. I. Pigment Yellow-97, C. I. Pigment Yellow-98, C. I. Pigment Yellow-114, C. I. Pigment Yellow-128, C. I. Pigment Yellow-129, C. I. Pigment Yellow-151, and C. I. Pigment Yellow-154.

In the composition of the present invention, pigments self-dispersing in water (self-dispersing pigment) may also be used. Self dispersing pigments include those utilizing steric hindrance of a polymer adsorbed on the surface of the pigment and those utilizing electrostatic repulsion, and commercially available such pigments include CAB-0-JET200 and CAB-0-JET300 (manufactured by Cabot Co., Ltd.) and Microjet Black CW-1 (manufactured by Orient Chemical Co., Ltd.).

The pigment content in the composition of the present invention is preferably 0.1 to 50 wt % based on the weight of the composition. If the pigment content is less than 0.1 wt %, a sufficient image density cannot be obtained, and if the pigment content is greater than 50 wt %, fixation of the image may be deteriorated. More preferably, the pigment content is in the range of 0.5 wt % to 30 wt %.

Dyes that can be used in the composition of the present invention may be known dyes including water soluble dyes such as a direct dye, acid dye, basic dye or reactive dye or food dyes, or insoluble dyes such as a disperse dye. Oil-soluble dyes may also be suitably used.

Examples of oil-soluble dyes include C. I. Solvent Blue-33, -38, -42, -45, -53, -65, -67, -70, -104, -114, -115, and -135; C. I. Solvent Red-25, -31, -86, -92, -97, -118, -132, -160, -186, -187, and -219; and C. I. Solvent Yellow-1, -49, -62, -74, -79, -82, -83, -89, -90, -120, -121, -151, -153, and -154.

Examples of water-soluble dyes include direct dyes such as C. I. Direct Black-17, -19, -22, -32, -38, -51, -62, -71, -108, -146, and -154;

C. I. Direct Yellow-12, -24, -26, -44, -86, -87, -98, -100, -130, and -142;

C. I. Direct Red-1, -4, -13, -17, -23, -28, -31, -62, -79, -81, -83, -89, -227, -240, -242, and -243;

C. I. Direct Blue-6, -22, -25, -71, -78, -86, -90, -106, and -199;

C. I. Direct Orange-34, -39, -44, -46, and -60;

C. I. Direct Violet-47 and -48;

C. I. Direct Brown-109; and

C. I. Direct Green-59; acid dyes such as C. I. Acid Black-2, -7, -24, -26, -31, -52, -63, -112, -118, -168, -172, and -208;

C. I. Acid Yellow-11, -17, -23, -25, -29, -42, -49, -61, and -71;

C. I. Acid Red-1, -6, -8, -32, -37, -51, -52, -80, -85, -87, -92, -94, -115, -180, -254, -256, -289, -315, and -317;

C. I. Acid Blue-9, -22, -40, -59, -93, -102, -104, -113, -117, -120, -167, -229, -234, and -254;

C. I. Acid Orange-7 and -19; and

C. I. Acid Violet-49; reactive dyes such as C. I. Reactive Black-1, -5, -8, -13, -14, -23, -31, -34, and -39;

C. I. Reactive Yellow-2, -3, -13, -15, -17, -18, -23, -24, -37, -42, -57, -58, -64, -75, -76, -77, -79, -81, -84, -85, -87, -88, -91, -92, -93, -95, -102, -111, -115, -116, -130, -131, -132, -133, -135, -137, -139, -140, -142, -143, -144, -145, -146, -147, -148, -151, -162, and -163;

C. I. Reactive Red-3, -13, -16, -21, -22, -23, -24, -29, -31, -33, -35, -45, -49, -55, -63, -85, -106, -109, -111, -112, -113, -114, -118, -126, -128, -130, -131, -141, -151, -170, -171, -174, -176, -177, -183, -184, -186, -187, -188, -190, -193, -194, -195, -196, -200, -201, -202, -204, -206, -218, and -221;

C. I. Reactive Blue-2, -3, -5, -8, -10, -13, -14, -15, -18, -19, -21, -25, -27, -28, -38, -39, -40, -41, -49, -52, -63, -71, -72, -74, -75, -77, -78, -79, -89, -100, -101, -104, -105, -119, -122, -147, -158, -160, -162, -166, -169, -170, -171, -172, -173, -174, -176, -179, -184, -190, -191, -194, -195, -198, -204, -211, -216, and -217;

C. I. Reactive Orange-5, -7, -11, -12, -13, -15, -16, -35, -45, -46, -56, -62, -70, -72, -74, -82, -84, -87, -91, -92, -93, -95, -97, and -99;

C. I. Reactive Violet-1, -4, -5, -6, -22, -24, -33, -36, and -38;

C. I. Reactive Green-5, -8, -12, -15, -19, and -23; and

C. I. Reactive Brown-2, -7, -8, -9, -11, -16, -17, -18, -21, -24, -26, -31, -32, and -33; and C. I. Basic Black-2;

C. I. Basic Red-1, -2, -9, -12, -13, -14, and -27;

C. I. Basic Blue-1, -3, -5, -7, -9, -24, -25, -26, -28, and -29;

C. I. Basic Violet-7, -14, and -27; and

C. I. Food Black-1 and -2.

Examples of the coloring materials described above are especially preferable for the composition of the present invention, but the coloring material that is used in the composition of the present invention is not specifically limited to the coloring materials described above.

The content of the dye that is used in the composition of the present invention is preferably 0.1 to 50 wt % based on the weight of the composition. If the content of the dye is less than 0.1 wt %, a sufficient image density cannot be obtained, and if the content is greater than 50 wt %, fixation of the image may be deteriorated. More preferably, the content of the dye is in the range of 0.5 wt % to 30 wt %.

In the present invention, the pigment and the dye may be used in conjunction.

[Additives]

To the composition of the present invention, various kinds of additives, assistants and the like may be added as required.

One of additives of the composition is a dispersion stabilizer for stabilizing a pigment in a solvent. The composition of the present invention has a function of dispersing solid particles such as a pigment with a polymer having a polyvinyl ether structure, but if dispersion is in sufficient, other dispersion stabilizer may be added.

As other dispersion stabilizer, a resin having both hydrophilic and hydrophobic portions or a surfactant can be used.

Resins having both hydrophilic and hydrophobic portions include, for example, copolymers of hydrophilic monomers and hydrophobic monomers. Hydrophilic monomers include acrylic acid, methacrylic acid, maleic acid, fumaric acid, the monocarboxylates described above, vinyl sulfonic acid, styrene sulfonic acid, vinyl alcohol, acrylamide and methacryloxyethyl phosphate, and hydrophobic monomers include styrene, styrene derivatives such as α-methyl styrene, vinylcyclohexane, vinyl naphthalene derivatives, acrylates and methacrylates. For the copolymer, various copolymers such as random, block and graft copolymers may be used. Of course, hydrophilic and hydrophobic monomers are not limited to those described above.

For the surfactant, anionic, nonionic, cationic and ampholytic surfactants may be used.

Anionic surfactants include fatty acid esters, alkyl sulfates, alkyl aryl sulfonates, alkyl diaryl ether disulfonates, dialkyl sulfosuccinates, alkyl phosphates, formalin naphthalenesulfonate condensates, polyoxyethylene alkyl phosphates and glycerol borate fatty acid esters.

Nonionic surfactants include polyoxyethylene alkyl ethers, polyoxyethylene oxypropylene block copolymers, sorbitan fatty acid esters, glycerin fatty acid esters, polyoxyethylene fatty acid esters, polyoxyethylene alkyl amines, fluorine surfactants and silicon surfactants.

Cationic surfactants include alkyl amine salts, quaternary ammonium salts, alkyl pyridinium salts and alkyl imidazolium salts.

Ampholytic surfactants include alkyl betaines, alkyl amine oxides and phosphatidyl choline. Similarly, the surfactant is not limited to those described above.

A composition containing the additives described above is provided, for example, as a composition different from the ink composition of the present invention, and it may be brought in contact, as required, with the ink composition to give a stimulus. Specifically, in the case of inkjet ink, for example, an ink tank containing an ink composition of the present invention and an ink tank containing a composition containing additives are prepared, and the compositions are discharged onto the same recording material separately and thus contacted with each other. Alternatively, a composition containing additives is provided to a recording medium in advance, to which the ink composition of the present invention is applied for contact with each other.

To the composition of the present invention, an aqueous solvent may be added as required. Particularly, if the composition is used in inkjet ink, the aqueous solvent is used for prevention of drying and solidification of the ink at a nozzle portion, and can be used alone or in mixture. For the aqueous solvent, those described above apply directly. In the case of ink, the content of the solvent is 0.1 to 60 wt %, preferably 1 to 25 wt % based on the total weight of the ink.

Other additives for ink include, for example, a pH adjuster for stabilizing the ink in the feeding pipe in a recording apparatus, a penetration agent promoting penetration of the ink into the recording medium and accelerating apparent drying, anti-mold agent preventing growth of mold in the ink, a chelating agent blocking metal ions in the ink and preventing precipitation of metals at the nozzle portion, precipitation of insoluble matters in the ink and the like, an antifoaming agent preventing foaming in during circulation and movement of a recording liquid or during production of the recording liquid, an antioxidant, a fungicide, a viscosity adjuster, a conducting agent, an ultraviolet absorber, a water soluble dye, a disperse dye, an oil-soluble dye and the like.

Inkjet ink (aqueous dispersion ink), which is a preferred embodiment of the ink composition of the present invention, will be described specifically below.

[Method for Production of Inkjet Ink]

A method for production of the composition is characterized by a step of encapsulating a coloring material in the block polymer where the block polymer is fully dissolved in a solvent, and then the solvent environment is changed to cause inclusion of the coloring material in the block polymer. More preferably, in the production step, the change in solvent environment is selected from change in pH, change in temperature and change in solvent hydrophilicity or a combination of two or more of the changes. An example of the production method of inkjet ink of the present invention will be described below.

To a block polymer having a vinyl ether structure in at least one segment, a solvent that can fully dissolve the polymer is added. The solvent is selected depending on the solubility of the polymer. For example, in the case of (II-a), each segment is responsive to heat, so that hydrophilicity and hydrophobicity can be controlled with temperature, and the solvent may be water if the temperature is 20° C. or lower. When the polymer has a hydrophobic group as (II-e) being only one example, the solvent may be toluene, chloroform or methanol. A solution of the block polymer is prepared in this way, then a coloring material is added and dispersed using a dispersion apparatus, and then the solvent environment is changed to encapsulate the coloring material. An example of the composition-producing method where the change in solvent environment is selected from change in pH, temperature and hydrophilicity of the solvent or combination of two or more thereof is as follows: a block polymer II-a is dissolved in water at 20° C. or lower, a pigment is then added and dispersed, and the resultant solution is heated to 25° C., whereby a segment comprised of 2-ethoxyethyl vinyl ether becomes hydrophobic and the block polymer becomes amphipathic, and micelles are formed in water and the coloring material is included therein. In the case of (II-e), a pigment is added and dispersed in a solvent in which a block polymer has been dissolved, and water is added to increase hydrophilicity of the solvent mixture, whereby the segment comprised of isobutyl vinyl ether causes phase separation to form micelles in which the coloring material is included. If required, coarse particles are then removed by centrifugal separation or the like. If necessary, a water soluble solvent may added to the product followed by stirring, mixing and filtration.

Dispersion apparatuses include, for example, an ultrasonic homogenizer, a laboratory homogenizer, a colloid mill, a jet mill and a ball mill, and they may be used alone or in combination.

The composition can be produced in the same manner when a self-dispersing pigment or oil-soluble dye is used.

[Image Formation Method and Image Formation Apparatus]

The aqueous dispersion ink in the present invention can be used with various image formation apparatuses of various printing methods such as the inkjet method and electrophotography, to form images by such an apparatus. If the composition is used as an inkjet ink, it can be used in the following manner in the present invention. The ink agglomerates with changes in solvent environment described below.

When the composition uses the block polymer (II-a), for example, an image can be formed using temperature as the change solvent environment. Due to the difference of the ink temperature in the tank and on the recording medium, the inkjet ink of the present invention cause phase separation resulting in rapid thickening or coagulation of insoluble components. Change in ink properties can improve blurring and feathering, and excellent fixation can be achieved. The change in ink properties is not limited to the above thickening or coagulation of insoluble components.

Similarly, an image can be formed changing the solvent environment by irradiation with electromagnetic wave, changing pH of the composition or changing concentration. The change in temperature preferably covers the phase transition temperature of the composition. Regarding exposure to electromagnetic wave, the wavelength of the electromagnetic wave is preferably in the range of 100 to 800 nm. Regarding the change in pH, it is preferably in the range of pH 3 to pH 12. The change in the composition concentration preferably spans the concentration at which the composition causes phase transition.

For the method for giving a stimulus for changing the solvent environment, various methods can be applied. One preferred method is a method in which a composition giving a stimulus and the ink composition described above are mixed together or made to contact each other. For example, to cause a change in solvent environment by changing pH, a composition having a corresponding pH can be mixed with the ink composition by using the ink jet method. As described in Japanese Patent Application Laid-Open No. S64-63185, a composition giving a stimulus can be applied to the entire surface of an area on which an image is formed by using an inkjet head, and as described in Japanese Patent Application Laid-Open No. H8-216392, the amount of a composition giving a stimulus can be controlled to form a better image.

The block polymer in the composition described above is preferably amphipathic, and a preferable solvent is water. With such a composition, micelles of the block polymer are formed to disperse a pigment excellently. And since most of the block polymer molecules are not dissolved but dispersed in a micelle state, a relatively low viscosity can be achieved. For the block polymer in the present invention, polymers described above can be used, but a block polymer having a polyvinyl ether structure described above is preferable. In the present invention, the composition is brought into contact with a composition that gives a stimulus to the block polymer portion, whereby the micelles form a network structure together to thicken the ink for excellent fixation. Thus, the image formation method using the composition of the present invention can achieve excellent fixation.

When the inkjet ink of the present invention and the stimulating composition are brought into contact, they may be applied as separate compositions. For example, the inkjet composition and the stimulating composition are put in separate packages, and contacted each other as required. In the case of inkjet ink, for example, an image can be formed by a method in which an ink tank containing the composition of the present invention and an ink tank containing the stimulating composition are prepared independently, and the compositions are separately discharged onto the same recording medium and contacted each other to form an image. Alternatively, a stimulating composition is previously provided to a recording medium by means such as coating or spraying, and the ink composition of the present invention is then discharged onto the recording medium where the compositions contact with each other and form an image.

It is also preferable that a mechanism for giving a stimulus is provided in the recording medium in advance. In an example of such a method, a pH responsive ink, specifically an acid responsive ink, is used to perform recording on a sheet of acid paper. In this case, the recording medium has a function of giving a stimulus to the stimulus-responsive ink of the present invention. This recording medium is included in the present invention. That is, the present invention relates to a recording medium having a function of giving a stimulus. In the present invention, the recording medium may be of any known form. For example, the recording medium can be plain paper, heat sensitive paper or acid paper.

Inkjet printers using the inkjet ink of the present invention include various inkjet recording apparatuses such as a piezo inkjet system using a piezoelectric element and a thermal inkjet system utilizing thermal energy to make a bubble in the ink to perform recording.

For the apparatus of the present invention, in the case of inkjet ink, for example, the amount of ink discharged from a discharge port of a discharge head is preferably in the range of 0.1 to 100 picoliter.

The composition of the present invention may also be used in an indirect recording apparatus using a recording system in which ink is printed on an intermediate transfer material, and then transferred to a recording medium such as paper. The composition may also be applied for an apparatus using an intermediate transfer material by a direct recording system.

The ink composition of the present invention may be also used in an image formation method and apparatus system in the electrophotographic recording system. An example image formation apparatus comprises a photosensitive drum on which a latent image is formed, means for forming a latent image on the photosensitive drum such as a light exposure means, ink-applying means, a transfer mechanism and a recording medium. For formation of an image by this apparatus, a latent image is first formed on the photosensitive drum, the composition of the present invention is applied to the latent image area or areas other than the latent image, and the obtained image is transferred onto the recording medium by the transfer mechanism and fixed thereon.

The outline of an inkjet recording apparatus will be described below with reference to FIG. 1. However, FIG. 1 is only one example of the configuration and does not limit the invention of this application.

Figure 1:
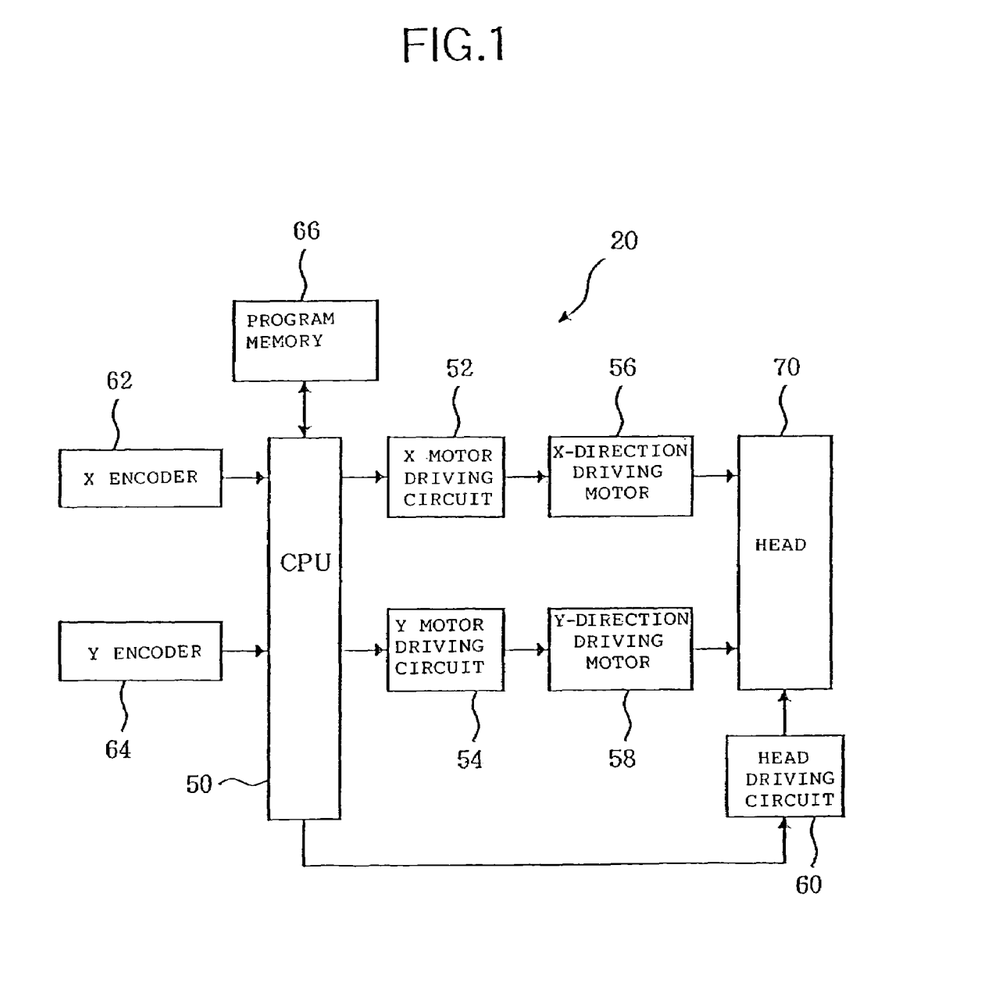
FIG. 1 shows an outlined mechanism of an image recording apparatus of the present invention.

FIG. 1 is a block diagram showing the configuration of the inkjet recording apparatus.

FIG. 1 shows recording onto a recording medium by moving a head. In FIG. 1, an X direction driving motor 56 and a Y direction driving motor 58 for driving a head 70 in X and Y directions is connected to a CPU 50 controlling the overall operation of a production apparatus through an X motor driving circuit 52 and a Y motor driving circuit 54. The X direction driving motor 56 and the Y direction driving motor 58 are driven through the X motor driving circuit 52 and the Y motor driving circuit 54 according to instructions by the CPU to determine a position of the head 70 relative to the recording medium.

As shown in FIG. 1, in addition to the X direction driving motor 56 and the Y direction driving motor 58, a head driving circuit 60 is connected to the head 70, the CPU 50 controls the head driving circuit 60, and drives the head 70, i.e. discharges inkjet ink, and so on. An X encoder 62 and a Y encoder 64 for detecting the position of the head are connected to the CPU 50, and information of the position of the head 70 is input to the CPU 50. A control program is input to a program memory 66. Based on this control program and information of the positions of the X encoder 62 and the Y encoder 64, the CPU 50 moves the head 70, and places the head to a desired position on a recording medium to discharge inkjet ink. In this way, a desired image is formed on the recording medium. In the case of an image recording apparatus capable of loading a plurality of inkjet inks, a desired image can be formed on the recording medium by performing the above operation for each inkjet ink predetermined times.

After inkjet ink is discharged, the head 70 can be moved to a position at which removal means (not shown) for removing excessive ink deposited on the head is disposed, and cleaned by wiping or the like. For the specific method of cleaning, a conventional method can be used directly.

When image formation is completed, the recording medium on which an image has been formed is replaced by a new recording medium with a mechanism for conveyance of recording media (not shown).

In the present invention, the embodiment described above can be modified or altered without departing from the spirit of the invention. For example, an example in which the head 70 is moved along X and Y axes has been described above, but a configuration is also possible in which the head 70 is moved only along the X axis (or Y axis), the recording medium is moved along the Y axis (or X axis), and an image is formed with the former and the latter interlocked with each other.

In the present invention, means (e.g. electrothermal converter, laser light, etc.) for generating heat energy as an energy source used for discharging inkjet ink is provided, and a head discharging inkjet ink with the heat energy brings about an excellent effect. According to such a system, fineness of image formation can be enhanced. By using the inkjet ink of the present invention, further excellent images can be formed.

For the typical configuration and principle of the apparatus comprising the means for generating heat energy, basic principles disclosed in U.S. Pat. Nos. 4,723,129 and 4,740,796 specifications are preferably used. This system is applicable to both so called the on-demand type and the continuous type, but the on-demand type is especially effective because at least one drive signal matching discharge information and giving a rapid increase in temperature exceeding nuclear boiling of a liquid is applied to an electrothermal converter retaining the liquid and placed in correspondence with a channel, whereby the electrothermal converter is caused to generate heat energy, and film boiling is created on the heated surface of the head, so that a bubble is formed in the liquid corresponding to the drive signal on a one-to-one basis. The liquid is discharged through a discharge opening by the growth and shrinkage of a bubble to form at least one droplet. This drive signal more preferably has a pulse shape because bubbles grow or shrink appropriately in an instant, and therefore discharge of a liquid with excellent responsivity can be achieved. For the drive signal having a pulse shape, those described in U.S. Pat. Nos. 4,463,359 and 4,345,262 specifications are suitable. If conditions described in U.S. Pat. No. 4,313,124 specification for an invention relating to a temperature-rise rate of the thermal action surface are employed, further excellent discharge can be performed.

For the configuration of the head, the present invention includes a configuration described in U.S. Pat. Nos. 4,558,333 and 4,459,600 disclosing a configuration in which a thermal action portion is placed in a curved area, in addition to the configuration of a combination of a discharge port, a liquid channel and an electrothermal converter (linear liquid channel or orthogonal liquid channel) as disclosed in the specifications described above. In addition, the present invention is effective even with a configuration based on Japanese Patent Application Laid-Open No. 59-123670 disclosing a configuration in which for a plurality of electrothermal converters, a common slit is a discharge portion of the electrothermal converters or Japanese Patent Application Laid-Open No. 59-138461 in which a hole absorbing pressure waves of heat energy is brought into correspondence with the discharge portion. That is, according to the present invention, inkjet ink can be discharged reliably and efficiently irrespective of the form of the head.

Further, the present invention can effectively applied to a full line type head having a length matching the largest width of the recording medium in the image formation apparatus of the present invention. The head may have either a configuration in which a plurality of heads are combined to meet the length or configuration as one head integrally formed.

In addition, the present invention is effective even if among serial types, a head fixed on an apparatus main body, or a replaceable chip type head which is mounted on the apparatus main body so that electrical connection can be established with the apparatus main body and ink can be supplied from the apparatus main body is used.

Further, the apparatus of the present invention may comprise droplet removing means. If the means is added, a further excellent discharge effect can be realized.

As a configuration of the apparatus of the present invention, addition of preliminary auxiliary means is preferable because the effect of the present invention can be still further stabilized. Specific examples of the means may include capping means for the head, pressure or suction means, preliminary heating means for heating using an electrothermal converter or other heating element or a combination thereof, and preliminary discharge means for performing discharge other than discharge of ink.

The apparatus that is the most effective for the present invention is an apparatus carrying out the film boiling method described above.

EXAMPLES

The present invention will be described in detail below with Examples, but the present invention is not limited to the Examples. In the following Examples, a method for synthesizing a block polymer of the present invention is described as well as ink compositions dispersing an oil-soluble dye therein as examples of aqueous dispersions. In the Examples of synthesis of polymers and dye-dispersion ink, only several specific examples are described, but the present invention is not limited to these examples.

Example 1

<Synthesis of Block Polymer>

Synthesis of a block polymer having a terminal carboxylic acid made of 2-ethoxyethyl vinyl ether (EOVE), 2-methoxyethyl vinyl ether (MOVE) and $HO(CH_2)_5COOH$ Poly[EOVE(2-ethoxyethyl vinyl ether)-b-MOVE(methoxymethyl vinyl ether)]—O—$(CH_2)_5COOH$ (b is a symbol indicating being block polymer) was synthesized according to the following procedure.

A glass container provided with a three-way stopcock was flashed with nitrogen, and the glass container was then heated at 250° C. under an atmosphere of nitrogen gas to remove adsorbed water. When the system reached the room temperature, 12 mmol of EOVE, 16 mmol of ethyl acetate, 0.1 mmol of 1-isobutoxyethyl acetate and 11 ml of toluene were added, and the reaction system was cooled. When the system temperature reached 0° C., 0.2 mmol of ethyl aluminum sesquichloride (equimolar mixture of diethyl aluminum chloride and ethyl aluminum dichloride) was added, and polymerization was started. The molecular weight was monitored with time by gel permeation column chromatography (GPC), and completion of polymerization of A component (EOVE) was confirmed.

Then, 12 mmol of B component (MOVE) was added, and polymerization was performed. Completion of polymerization of B component was confirmed by GPC, and 30 mmol of $HO(CH_2)_5COOEt$ was then added to stop the polymerization reaction. The reaction mixture solution was diluted with dichloromethane, and washed with 0.6 M hydrochloric acid three times, and then distilled with water three times. The resultant organic phase was concentrated to solidify on an evaporator to obtain a block polymer of poly[EOVE-b-MOVE] —$O(CH_2)_5COOEt$.

The synthesized compound was identified by GPC and NMR. The end portion was identified by confirming existence of a terminus in the spectrum of high molecular weight materials by the NMR DOSY method. Mn was $2.1 \times 10^4$, and Mw/Mn was 1.4. Mn represents a number average molecular weight, and Mw represents a weight average molecular weight.

The ester portion at the end of the obtained poly[EOVE-b-MOVE] —$O(CH_2)_5COOEt$ was hydrolyzed and identified by NMR to confirm that poly[EOVE-b-MOVE] —$O(CH_2)_5COOH$ was obtained.

26 parts by weight of the thus obtained block polymer having a carboxylic acid terminus were stirred at 0° C. for 3 days together with 200 parts by weight of an aqueous sodium hydroxide solution of pH 11 to prepare a solution of sodium carboxylate polymer where the polymer was fully dissolved. The polymer was extracted with methylene chloride. After drying, the solvent was distilled away to isolate the polymer.

Then, 97 parts by weight of ion exchanged water were added to 4 parts by weight of the polymer, and the block polymer was dissolved at 0° C. using a homogenizer.

Then, 30 parts by weight of yellow oil-soluble dye (trade name: Yellow 3150 manufactured by Orient Chemical Co., Ltd.) were dissolved in 70 parts by weight of toluene. 20 parts by weight of the coloring material solution were added to 65 parts by weight of the block polymer aqueous solution, and dispersed/mixed using a homogenizer at 0° C. The resultant mixture was heated to 25° C. to form micelles composed of the block polymer encapsulating the liquid coloring material. Finally, 10 parts by weight of diethylene glycol and 5 parts by weight of 2-pyrolidone were added, and mixed using a homogenizer. Then coarse particles were filtered away to prepare an ink composition of the present invention. The structure including the liquid coloring material was observed using electron microscope observation.

When the ink composition was contacted with a 5 wt % aqueous polymethacrylic acid solution adjusted to pH 2, yellow agglomerates were formed to confirm that the ink composition was responsive to a stimulus.

Example 2

A 5 wt % aqueous polymethacrylic acid solution adjusted to be pH 2 as used in Example 1 was sprayed onto a sheet of plain paper. Then printing was carried out by spraying the ink composition produced in Example 1 onto the paper.

One minute after the spraying of the ink composition, a blank plain paper was pressed against the printed area under a load of $4.9 \times 10^4$ N/m² to evaluate the fixation strength on the basis whether or not the blank plain paper was smeared with the ink. Ink smear on the blank plain paper was not observed. The same test was conducted five times, and the same result was obtained for each test.

Comparative Example 1

6 parts by weight of yellow oil-soluble dye (trade name: Yellow 3150 manufactured by Orient Chemical Co., Ltd.) were dissolved in 94 parts by weight of toluene, and printing and evaluation of fixation strength were carried out in the same manner as in Example 2. The ink attached onto the blank plain paper was observed.

Example 3

<Synthesis of Block Polymer>

Synthesis of diblock polymer composed of isobutyl vinyl ether and $CH_2$=$CHOCH_2CH_2OPhPh$ (IBVE-r-VEEtPhPH: A block) and 2-methoxyethyl vinyl ether (MOVE: B block)

A glass container provided with a three-way stopcock was flashed with nitrogen gas, and then heated at 250° C. under a nitrogen atmosphere to remove adsorbed water. The system was returned to room temperature, to which 6 mmol of IBVE, 6 mmol of VEEtPhPh, 16 mmol of ethyl acetate, 0.1 mmol of 1-isobutoxyethyl acetate and 11 ml of toluene were added. Then the reaction system was cooled to 0° C., 0.2 mmol of ethyl aluminum sesquichloride (equimolar mixture of diethyl aluminum chloride and ethyl aluminum dichloride) was added thereto to start polymerization. The molecular weight was monitored with time by gel permeation chromatography (GPC), and completion of polymerization of A block was confirmed.

Then, 24 mmol of MOVE for B block was added and polymerization was continued. Completion of polymerization of B block was confirmed by monitoring using GPC, and then the polymerization reaction was stopped by adding 0.3% by mass of an aqueous ammonia/methanol solution to the system. The reaction mixture solution was diluted with dichloromethane, and washed with 0.6 M hydrochloric acid three times, and then with distilled water three times. The resultant organic phase was concentrated to dryness on an evaporator. The resultant material was dried under vacuum, and then repeatedly dialyzed against methanol using a semi-permeable cellulose membrane to remove monomers and obtain a diblock polymer as a desired product. The compound was identified by NMR and GPC. Mn was 32500, and Mw/Mn was 1.24. The polymerization ratio was A:B=100:200. The polymerization ratio of two types of monomers in A block was 1:1.

Example 4

15 parts by mass of the AB type diblock polymer obtained in Example 3 were, dissolved in 150 parts by mass of dimethyl formamide, and the resultant solution was gradually converted into a water phase using 400 parts by mass of distilled water to obtain an aqueous polymer dispersion.

Example 5

1 ml of the aqueous polymer dispersion obtained in Example 4, 4 ml of a 0.1 mol/l aqueous NaOH solution and 75 ml of distilled water were mixed, to which a 0.1 mol/l aqueous HCl solution was gradually added measuring pH and DLS (dynamic light scattering). The results are shown below.

| Amount of 0.1 N HCl aq added (ml) | pH | Particle size (nm) |
| --- | --- | --- |
| 0 | 11.3 | 102 |
| 2.0 | 10.6 | 99 |
| 3.5 | 8.9 | 89 |
| 4.0 | 6.8 | 75 |
| 4.5 | 3.3 | 84 |
| 6.0 | 2.8 | 91 |

As described above, the nonionic hydrophilic polymer extended its chain in both acidic and alkaline solutions with increase in micelle diameter.

Example 6

15 parts by mass of the AB type diblock polymer obtained in Example 3 and 7 parts by mass of oil blue N (C.I. Solvent Blue-14 manufactured by Aldrich Co., Ltd.) were co-dissolved in 150 parts by mass of dimethyl formamide, and the resultant solution was gradually converted into a water phase using 400 parts by mass of distilled water. Thus an ink composition was obtained. Oil blue N was not separately precipitated even after the ink composition was left standing for 10 days.

Comparative Example 2

2 parts by mass of a black self-dispersing pigment (trade name: CAB-0-JET300 manufactured by Cabot Co., Ltd.), 0.5 parts by mass of a surfactant (Nonion E-230 manufactured by NOF Corporation), 5 parts by mass of ethylene glycol and 92.5 parts by mass of ion exchanged water were mixed to prepare an ink composition. The ink composition was filled in a print head of an inkjet printer (trade name: BJF800 manufactured by Canon Inc.) to perform solid printing. One minute after printing, the printed area was strongly rubbed with a line marker five times. Black tailing was observed after the first run.

Example 7

An aqueous hydrochloric acid solution of pH 3 was sprayed onto a sheet of plain paper to produce a recording medium. The ink composition obtained in Example 6 was filled in a print head of an inkjet printer (trade name: BJF800 manufactured by Canon Inc.) to perform solid printing on the recording medium. One minute after printing, the printed area was strongly rubbed with a line marker five times but no blue tailing was observed. Thus fixation of the ink composition was very good.

Comparative Example 3

The ink composition obtained in Example 6 was filled in a print head of an inkjet printer (trade name: BJF800 manufactured by Canon Inc.) to perform solid printing on a sheet of plain paper. One minute after printing, the printed area was strongly rubbed with a line marker five times. Blue tailing was observed after the fourth run.

INDUSTRIAL APPLICABILITY

As described above, according to the present invention, a composition excellent in fixation, particularly an inkjet ink, can be provided. The composition comprises at least a block polymer encapsulating a material of a predetermined function and a solvent, and is characterized in that a property of the block polymer in the composition is changed in response to a stimulus, whereby the block polymer encapsulating the material agglomerate together.

The present invention can provide print images excellent in fixation according to an image formation method using the composition and an image formation apparatus that is used in the method.

The invention claimed is:

1. An image formation method wherein an image is formed through a process that a composition comprising a block polymer encapsulating a functional material of a predetermined function and a solvent is applied to a medium, and a property of the block polymer is changed in response to a received stimulus, whereby the block polymer encapsulating the functional material agglomerates together, wherein the stimulus is a change in pH, and the size of particles in the composition comprising the block polymer encapsulating the functional material is increased by the change in pH, whereby an image is formed on a medium.

* * * * *